T. FAWCUS.
DOUBLE HELICAL GEAR WHEEL.
APPLICATION FILED JAN. 4, 1910.

971,980.

Patented Oct. 4, 1910.

WITNESSES

INVENTOR

UNITED STATES PATENT OFFICE.

THOMAS FAWCUS, OF PITTSBURG, PENNSYLVANIA.

DOUBLE HELICAL GEAR-WHEEL.

971,980.  Specification of Letters Patent.  Patented Oct. 4, 1910.

Application filed January 4, 1910. Serial No. 536,283.

*To all whom it may concern:*

Be it known that I, THOMAS FAWCUS, of Pittsburg, Allegheny county, Pennsylvania, have invented a new and useful Double Helical Gear-Wheel, of which the following is a full, clear, and exact description, reference being had to the accompanying drawings, forming part of this specification, in which—

Figure 1:
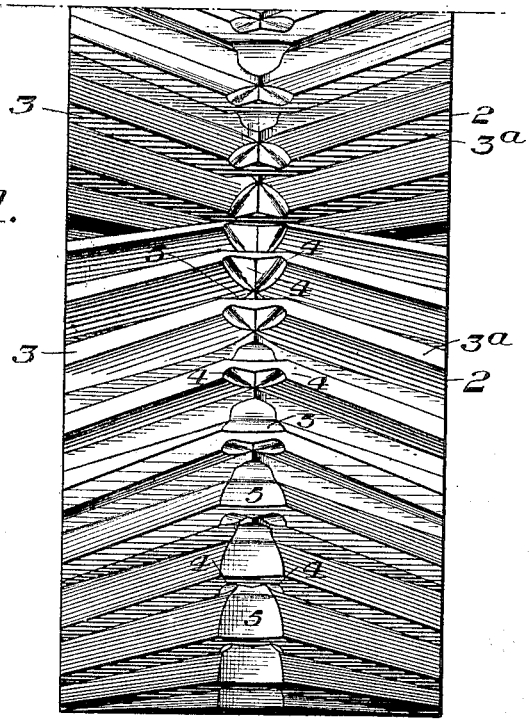
Figure 2:
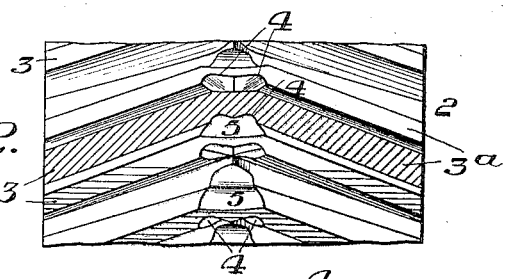
Figure 3:
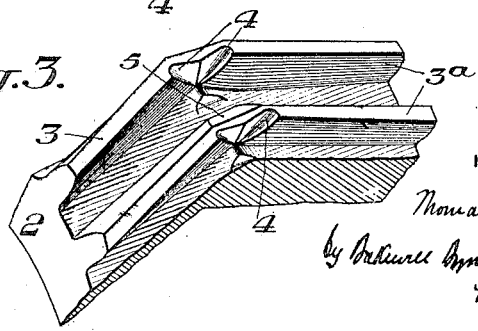

Figure 1 is a plan view, showing one wheel and a portion of an intermeshing wheel, embodying my invention; Fig. 2 is a sectional view taken through the pitch lines of two intermeshing gears embodying my invention, the sectioned tooth of the intermeshing gear being, however, shown in development instead of in its actual position; and Fig. 3 is a perspective view of a portion of the wheel and showing two pairs of teeth.

My invention has relation to double helical spur gearing. Various expedients have heretofore been adopted in construction of these wheels, in order to enable them to be manufactured and to provide proper clearance at the points where the two sets of helically directed teeth meet or intersect. Thus, in order to overcome the difficulties of cutting gears of this character, they have been cast, and the teeth subsequently chipped, filed and finished; they have been formed in separate pieces and secured together; the teeth of the two sets have been staggered with relation to each other, or have been separated by wide clearance grooves requiring a separate cutting operation, and various other means have been employed.

By means of my novel construction, I provide a gear which can be readily cut by a hob in an accurate manner, and which will provide for proper clearance and meshing of the wheels. I also provide teeth of much greater strength.

The precise nature of my invention will be best understood by reference to the accompanying drawings, and which will now be described.

In this drawing, the numeral 2 designates gear wheels embodying my invention, and which are provided each with the two sets of teeth 3 and 3ª. These teeth are cut by hobs which gradually work in toward the center or points of intersection of the two sets of teeth, both the hob and the gear blanks being revolved during the cutting operation. In accordance with my invention, the cutting from each side on each tooth is allowed to proceed to a point beyond the center of the gear, thereby producing a cut in the face of the meeting tooth at the opposite side of the center. The cuts so produced are indicated on the drawings at 4. After the gear has been cut in this manner, the hob is turned at a different angle and is caused to make cuts to remove the apexes of the meeting teeth, these cuts being shown at 5 and being directly opposite the cuts 4, which are produced in the manner before described. In this manner the grooves between adjacent teeth are widened at the center of the wheel, and a pair of gears cut in this manner will mesh perfectly with each other, and will have proper clearance. The operation of cutting is a simple one, since the same cutting hob or tool may be used for producing both the cuts 4 and 5 by a simple change in its position. The cuts 4 being simply extensions of the cuts which form the spaces between the teeth do not add materially to the expense of cutting, and the cutting off of the apexes at the opposite sides of each pair of teeth can be quickly and rapidly performed. The connecting portions of each pair of teeth act as bridges which greatly increase the strength of the teeth. Owing to the heavy inward thrusts received by the teeth in service, this is a feature of importance.

I claim:

1. A gear wheel having thereon two sets of oppositely directed helical teeth, the teeth of the two sets being connected by an intermediate portion of less thickness than the thickness of the teeth and which has a flattened face at one side approximately parallel to the axis of the wheel, and which, upon its opposite side is recessed by prolongations of the spaces between the teeth; substantially as described.

2. A gear wheel having thereon two sets of oppositely directed helical teeth, joined at their inner ends by connecting portions, the spaces between adjacent teeth being enlarged at the inner ends of the two sets of teeth and such enlargements extending into said connecting portions upon one face of the latter, the opposite face thereof being cut away and extending approximately parallel to the axis of the wheel; substantially as described.

3. A pair of similar intermeshing gear wheels, each of which has two sets of oppositely directed helical teeth, the two sets of teeth on each wheel being joined at their inner ends, the inner ends of the adjacent teeth being recessed on one side and being also cut away at their opposite sides to permit the two similar wheels to mesh into each other; substantially as described.

In testimony whereof, I have hereunto set my hand.

THOS. FAWCUS.

Witnesses:
 H. M. CORWIN,
 GEO. H. PARMELEE.